April 3, 1934.　　　B. E. LENEHAN　　　1,953,114
REMOTE METERING SYSTEM
Filed March 26, 1929
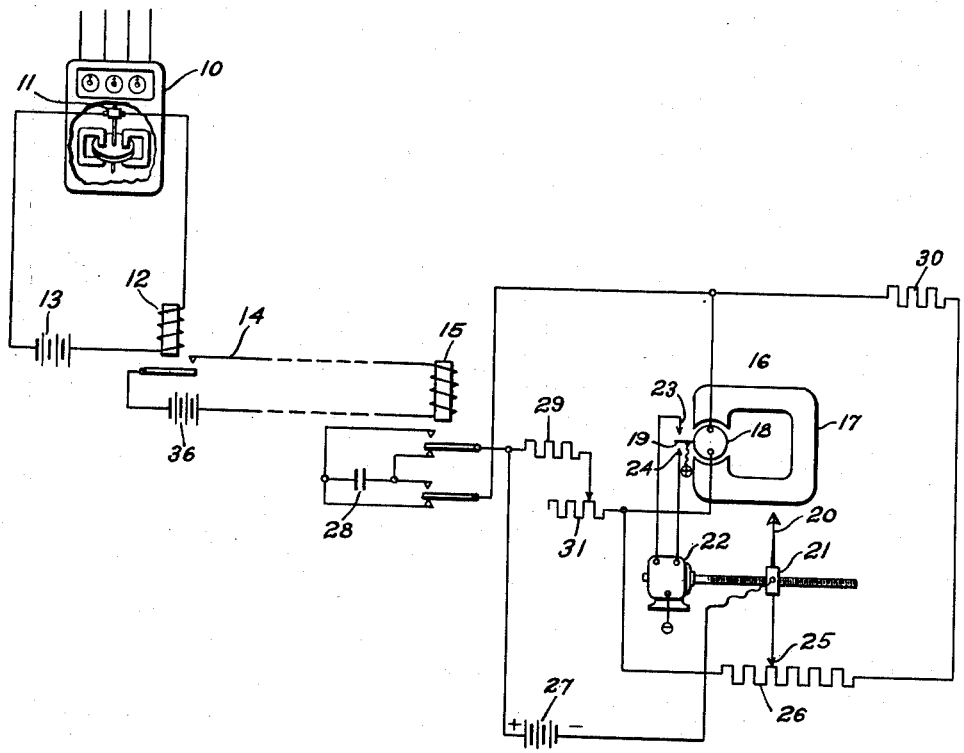
INVENTOR
*Bernard E. Lenehan.*
BY
ATTORNEY Patented Apr. 3, 1934

1,953,114

UNITED STATES PATENT OFFICE 1,953,114

REMOTE-METERING SYSTEM

Bernard E. Lenehan, Bloomfield, N. J., assignor to Westinghouse Electric & Manufacturing Company, a corporation of Pennsylvania Application March 26, 1929, Serial No. 349,988

8 Claims. (Cl. 177—351)

My invention relates to remote-metering systems and, more particularly, to receiving devices utilized in remote-metering systems of the impulse type.

Remote-metering systems of the impulse type have become well known. In such systems, the operation of a distant meter is indicated by the frequency of electrical impulses generated by said meter in its movement and transmitted to a receiving station.

It is the general object of this invention to improve the receiving devices utilized heretofore in such systems.

A further object of my invention is to eliminate all mechanical means for producing a restoring torque upon the receiving device.

In receiving devices for remote-metering systems, it has been the practice heretofore to utilize an electromagnetic relay having a winding adapted to be energized by the impulses transmitted from the distant meter and serving to control a motor for shifting the position of an indicating and recording mechanism, the motor being employed also to actuate a rheostat for controlling the energization of a second or restoring coil on said relay. In accordance with my invention, I propose to eliminate the second or restoring coil and to balance the actuating and restoring forces electrically instead of magnetically.

For a more complete understanding of my invention, reference may be had to the accompanying drawing, the single figure of which is a diagrammatic illustration of my invention.

Referring, in detail, to the drawing, an electrical measuring instrument 10, such as a watthour meter, is provided with a contact-making mechanism 11, which is well known, to produce impulses in a local circuit including a relay 12 and a current source 13. The relay 12 operates to generate corresponding impulses in a transmission circuit 14 including the line relay 15 at the receiving station and a current source 36.

In addition to the line relay 15, the receiving equipment includes a relay 16 which, as illustrated, is of the galvanometer type. The relay 16 comprises a permanent magnet 17 and a cooperating movable coil 18 provided with a contact lever 19.

An indicating and recording member 20 is mounted on a shiftable carriage 21, the position of which is controlled by a reversible motor 22. The motor 22 is controlled by the contact lever 19 of the relay 16 and cooperating contacts 23 and 24 so that, when the coil 18 is energized, the lever 19 tends to engage one of the contacts 23 and 24 to cause an appropriate movement of the indicator carriage 21.

The moving contact 25 of a rheostat 26 is also actuated by the carriage, the rheostat 26 serving to control the voltage applied to the winding 18 from a local source 27.

When the line relay 15 is periodically energized a condenser 28 is connected alternately to opposite terminals of the current source 27. The condenser 28 is thus successively charged and recharged by the battery 27 through the coil 18 of the relay 16. Protective and calibrating resistors 29, 30 and 31 are desirable adjuncts of the system shown.

In operation, the system of my invention provides a means for indicating and recording the movement of the measuring device 10 at a distance therefrom. This result is accomplished as follows. The rotation of the watthour meter 10, or other equivalent device, causes impulses to be generated in the local circuit 12—13 at a rate proportional to the speed of the meter 10 and, therefore, to the magnitude of the load measured thereby. The impulses just mentioned are repeated in the transmission circuit by the relay 12 and in the receiving circuit by the relay 15.

When the relay 15 is deenergized, the condenser 28 is charged from the battery 27, through a circuit from the negative terminal of the battery to the moving contact 25 of the rheostat 26. At this point, the circuit divides and one branch includes the left-hand portion of the rheostat 26 and the calibrating and protective resistors 31 and 29. The coil 18 and condenser 28 form a circuit in parallel with these resistors. The other branch of this circuit includes the remainder of the rheostat 26, the protective resistor 30 and the condenser 28. Simultaneously, a steady current flows through the coil 18 of the relay 16, the current being dependent upon the position of the moving contact 25 of the rheostat 26. The relay 16 is so designed that, when current flows in the circuit just traced, a counter-clockwise torque will be exerted upon the lever 19 to cause it to engage the associated contact 24 which is connected to the reverse winding of the motor 22.

When the relay 15 is energized, the condenser 28 is discharged through the coil 18 of the relay 16 and the resistors 29 and 31 and recharged in the opposite sense. A small portion of the discharge current may also pass through the parallel circuit including the resistor 30 and the right-hand portion of the rheostat 26. The direction of the current passing through the coil 18, as a result of the discharge of the condenser 28, is the reverse of that of the steady current flowing through said coils from the battery 27. The result of this fact is that, when the quantity of the current flowing in the coil 18, as a result of the condenser discharges, is greater than that flowing in said coil from the battery 27 through the rheostat 26, the lever 19 will engage its upper contact 23 to energize the forward winding of the motor 22. The carriage 21 is, thereupon, shifted to indicate an increased load at the distant point at which the measuring device 10 is located. At the same time, the rheostat contact 25 is advanced to increase the portion of the voltage of the battery 27 which is applied to the coil 18. When a balance between the two opposing currents has been reached, the lever 19 is restored to its neutral position, and the motor 22 stops.

In a similar manner, upon a decrease in the frequency of the condenser discharges, the quantity of the steady current in the coil 18 will be greater than that of the impulse current so that the lever 19 will engage the contact 24 to move the carriage 21 to indicate a lower load at the distant point. Simultaneously, the magnitude of the restoring current is reduced by the adjustment of the contact 25 and the rheostat 26.

It will be apparent from the foregoing that, in the system of my invention, I do not rely upon two separate windings independently energized for actuating and restoring the relay movement which controls the setting of the indicating and recording means. On the contrary, I employ a single winding. Specifically, a relay of the galvanometer type is employed, the moving coil thereof being energized by the difference between the impulse current and the steady current.

It will also be obvious that, instead of balancing the magnetic effects of two electrically separate windings, I balance the currents applied to a unitary coil. Numerous advantages, obviously, result from this construction. One of these is that the device may be manufactured more cheaply and another is that it is less likely to faulty operation in service. Lower maintenance costs and greater accuracy of indication and recording may be expected.

Since various modifications and changes in my invention will, no doubt, suggest themselves to those skilled in the art, it is not my intention to be limited to the embodiment of my invention shown and described herein except as may be necessitated by the scope of the appended claims.

I claim as my invention:

1. A receiver for remote-metering systems comprising a motor-operated device for indicating a measured electrical quantity, a galvanometer relay provided with an operating coil for controlling the energization of the indicating device, a source of current, a condenser for energizing the galvanometer relay, a line relay responsive to current impulses for alternately connecting the condenser across the source of current for charging said condenser and the operating coil of the galvanometer relay to discharge it to energize said coil in a predetermined direction in accordance with the rate at which the line relay is operated by current impulses, said operating coil being connected to the source of current to receive steady current opposite in direction to that of the condenser discharge current, and a rheostat actuated by the indicating device for controlling the amount of steady current, thereby to provide for electrically balancing the galvanometer relay when the position of the indicating device corresponds to the quantity measured by the measuring device.

2. A receiver for current-impulse remote-metering systems comprising an electro-responsive contact-making relay having a single movable coil, an indicating device, a motor controlled by the relay for actuating said device, a source of current, said coil being energized by a steady current from the source in one direction, means including a condenser for energizing the coil of the relay in the opposite direction to effect the operation of the motor in a predetermined direction, said condenser being alternately charged from the current source and discharged through the coil and a rheostatic device actuated by the motor for controlling the amount of steady current flowing through the coil of the relay thereby to cause the indicating device to assume a position corresponding to the frequency of the condenser discharges.

3. A receiver for current-impulse remote-metering systems comprising a galvanometer type relay having a contact-making member actuated by a movable coil, a current source, means including a condenser for energizing the relay coil in one direction in accordance with transmitted current impulses and means for alternately charging the condenser from the current source and discharging it through the coil, said relay coil being also connected to the current source to be energized in the opposite direction with a steady current, a rheostat for varying the flow of steady current in said coil, a motor controlled by the relay contact-making member for adjusting the rheostat to maintain a balance between the energization of the relay coil by the means including the condenser and by the rheostat from the current source, and an indicating device actuated by the motor.

4. A receiver for impulse remote metering systems comprising indicating means, a source of current means responsive to current impulses including a condenser, means for alternately charging the condenser from the current source and discharging it and a galvanometer relay energized in a predetermined direction by the condenser discharge for controlling the operation of the indicating means, said galvanometer relay being energized in the opposite direction from the current source by a steady current and means actuated by and in accordance with the movement of the indicating means for electrically balancing the galvanometer relay by controlling the amount of flow of steady current whereby said galvanometer relay is caused to function automatically to maintain the indicating means in a position corresponding to the rate at which the current impulses are received.

5. A receiver for impulse remote metering systems comprising an indicator carriage, electro-responsive means for actuating the carriage, a source of direct current, means including a condenser and a relay provided with a single coil disposed to be energized by the condenser discharges in a predetermined direction for controlling the operation of the electro-responsive means, means responsive to current impulses for alternately charging the condenser from the current source and discharging it through the relay coil, and means including a rheostat for connecting the relay coil to the direct-current source to be energized in the opposite direction, said rheostat being actuated by the electro-responsive means.

6. A receiver for impulse remote metering systems comprising, an electro-responsive indicating device, a galvanometer relay provided with a rotatably-mounted coil, said coil being provided with a contact making member for controlling the energization and direction of operation of the indicating device, a source of current for energizing the rotatably-mounted coil in one direction with a steady flow of current, a variable resistor controlled by the indicating device for varying the flow of steady current through the relay coil in accordance with the position of the indicating device, a condenser, and means responsive to current impulses operable to alternately charge the condenser from the current source and discharge it through the rotatably-mounted coil in a direction opposite to the flow of steady current.

7. A receiver for impulse remote metering systems comprising, an electro-responsive indicating device, a galvanometer switch device for controlling the energization and direction of operation of the indicating device, said galvanometer switch device having a single operating coil, a source of current, a condenser, a relay successively operable to alternately charge the condenser from the current source and discharge it through the coil of the galvanometer switch device in one direction to cause the indicating device to be operated in one direction, said coil being connected to the current source to be energized by a steady flow of current in a direction opposite to the discharge currents from the condenser, and resistance means controlled by and in accordance with the movements of the indicating device for varying the flow of steady current through the coil, thereby to cause the indicating device to assume a position corresponding to the frequency of the condenser discharges.

8. A receiver for impulse remote metering systems comprising, in combination, a line relay successively operable to closed and open positions in response to current impulses, a source of direct current, a condenser disposed to be alternately charged from the direct current source and discharged in accordance with the successive operations of the line relay, a motor-operated indicating device, a relay for controlling the energization and direction of operation of the motor-operated indicating device, said relay having a single movable coil differentially responsive to the discharge currents of the condenser and a steady current from the direct-current source, and means actuated by and in accordance with the position of the indicating device for determining the amount of steady current flowing through the relay.

BERNARD E. LENEHAN.